United States Patent [19]

Hayes

[11] Patent Number: 4,801,780
[45] Date of Patent: Jan. 31, 1989

[54] MIG WELDER ATTACHMENT FOR AN ELECTRIC HAND DRILL

[75] Inventor: Peter F. Hayes, Santa Fe, N. Mex.

[73] Assignee: Omniverse Research, Inc., Los Gatos, Calif.

[21] Appl. No.: 108,347

[22] Filed: Oct. 14, 1987

Related U.S. Application Data

[63] Continuation of Ser. No. 789,907, Oct. 21, 1985, Pat. No. 4,703,156.

[51] Int. Cl.$^4$ .............................................. B23K 9/10
[52] U.S. Cl. ................................. 219/130.1; 219/136; 219/137.2
[58] Field of Search .................... 219/130.1, 132, 133, 219/134, 137 RS, 137.2, 136

[56] References Cited

U.S. PATENT DOCUMENTS

| | | | |
|---|---|---|---|
| 2,909,646 | 10/1959 | Russell | 219/137.62 X |
| 3,575,573 | 4/1971 | McCollister | 219/130.1 |
| 4,508,954 | 4/1985 | Kroll | 219/132 |
| 4,531,045 | 7/1985 | Kemp | 219/132 |
| 4,590,357 | 5/1986 | Winkler | 219/130.1 |

FOREIGN PATENT DOCUMENTS

0209477  12/1983  Japan ................................ 219/132

*Primary Examiner*—Clifford C. Shaw

*Attorney, Agent, or Firm*—Sughrue, Mion, Zinn, Macpeak, and Seas

[57] ABSTRACT

A dielectric cover is detachably coupled, in enveloping fashion, about the motor casing portion of an electric hand drill of pistol form with a front portion extending beyond the drill shaft projecting from the front end of the drill casing. The cover acts as a torque tube to support a right angle drive reduction gear mechanism which terminates in a drive wheel rotating about an axis perpendicular to the drill shaft axis and within a friction drive mechanism, completed by spring biased idler wheel pressing sidewise against the drive wheel. Metal blocks mounted to the cover connect to one side of a DC source and mount a wire guide for guiding a thin wire first electrode into contact with and between the drive wheel and the idler wheel. The wire electrode which is frictionally pulled from a spool borne by the cover feeds through a conductor tube of an electrode nozzle assembly. The conductor tube receives an inert shielding gas which flows about the thin wire first electrode and the arc. The variable speed drill uses the trigger mechanism to control wire electrode feed speed and thus the amperage of the weld arc, with workpiece functioning as the second electrode. Owing to the inherently stable arc as derived from storage batteries, arc and drive power sources require no stabilizing interlock and may thus be entirely separate or identical, as convenience may dictate, without affecting either arc or drive either benficially or adversely.

3 Claims, 3 Drawing Sheets

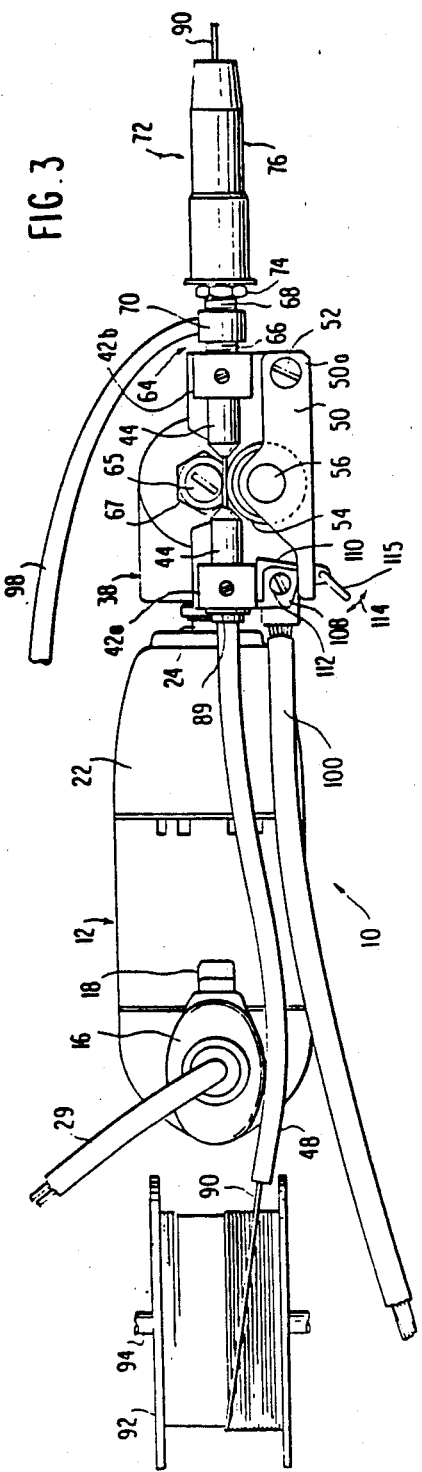

MIG WELDER ATTACHMENT FOR AN ELECTRIC HAND DRILL

This application is a continuation application of application Ser. No. 789,907, filed Oct. 21, 1985, now U.S. Pat. No. 4,703,156, and identically entitled.

FIELD OF THE INVENTION

This invention relates to a MIG arc welding apparatus and more particularly to a simple attachment to a variable speed electric hand drill which may be readily attached to and detached therefrom, to provide a highly effective professional quality, low cost MIG arc welding apparatus with variable speed drill power source electrically independent from the arc power source.

BACKGROUND OF THE INVENTION

MIG arc welding apparatus is in high vogue. U.S. Pat. No. 4,079,231 is exemplary of such MIG arc welding apparatus. A torch supports a consumable wire electrode fed to the torch by wire feeder rolls which sandwich the wire to drive it through a passage within the torch. That passage is also subjected to a shielding gas with the gas surrounding and shielding the consumable wire electrode as it exits from a contact tube. It functions to shield the arc which is established between the consumable wire electrode and a second electrode constituted by the workpiece. In that patent, the wire feeder rolls are driven by a motor whose speed is controlled by a motor governor via a control circuit. To effect welding, the operator touches the end of the consumable wire against the workpiece and this results in an instantaneous short circuit across a power supply in a sensing circuit. The sensing circuit provides a low voltage output signal which is fed to the control circuit. The control circuit produces, in turn, an output signal which energizes the welding contactor and the welding contactor produces a signal which turns on the power supply. With the power supply turned on, the arc is immediately established between the consumable wire electrode and the workpiece electrode. Also in response to the sensing circuit output signal the control circuit feeds a signal to the motor governor which starts the wire feeder motor. Additionally, the control circuit feeds the signal to the gas supply which initiates flow of a shielding gas to the torch. Upon establishment of the arc between the consumable wire electrode and the workpiece electrode, the output from the sensing circuit terminates. However, the flow of welding current through the cable lead to the torch and thus to the consumable wire electrode is immediately sensed by a current detector circuit, which circuit is connected to a part of the cable lead. The detector circuit produces in turn an output signal which is fed to the control circuit, and the control circuit in response to the output signal continues to maintain the signal to the welding contactor. This keeps the power supply in circuit and also maintains the signal to the motor governor and the signal to the gas supply so that the motor drive system and the supply of inert gas continues. Thus, the wire feeder motor continues to operate and the flow of shielding gas to the torch is maintained.

Such consumable metal inert gas (MIG) arc welding is in large use because the MIG welders are faster and use less heat (amperage) for a given weld than other common welding methods so that heat distortion of the workpiece is minimal. Such conventional MIG welders may utilize storage batteries as the source of the DC arc current. But in each case, the arc and drive power is electronically coupled to yield "semi-automatic" features. MIG welders are not necessarily inexpensive. Units sold under the trademark Century cost about $700 while a MILLER SPOOLMATIC MIG welder gun alone may cost about $1000 with a further cost of $2,000 for a power source. The MILLER SPOOLMATIC requires electronic modification to a 240 volt AC (household or three-phase industrial current) to obtain a 24 volt DC non-drooping voltage current at the arc. As for the Century unit, which runs on DC batteries, the unit is too large for portability. Cost is high because drive and arc power are electronically coupled. It is designed for use almost exclusively in welding steel and the drive speed is too slow for soft metal welds, particularly aluminum. The long drive train powered by a 24 volt motor causes the Century unit to be less energy-efficient and the push drive of the consumable wire electrode tends to cause "bird-nesting" of the consumable thin wire electrode.

MIG arc welding is also known as "semi-automatic fine wire welding". The term "semi-automatic" refers to the electrical or electronic coupling of arc and drive power in an effort to stabilize the arc voltage independent of human-induced accidental variations in arc distance. In most systems, the arc power source requires expensive electronic components to achieve a "non-drooping voltage" characteristic. In some systems where auto or deep cycle storage batteries are used as the power source, as in Century s portable MIG welding system, an expensive and wholly unnecessary electronic couple exists between the drive and the arc. The applicant has determined, and the present invention is based on, the recognition of the inherent stability of arc power when storage batteries are used for the power source. Thus, when auto or deep-cycle storage batteries are used for the arc power source, the resulting arc is so inherently stable that no electric or electronic couple to the drive power is required or desired. The applicant has determined that storage batteries are capable of such power (inherent reserve power) that any attempt at manual modification of arc distance. accidental or intentional, has no appreciable effect on arc stability; specifically on arc voltage. A fortuitous and inherently stable match in arc and power source resistances assures an inherently stable arc gap and stable arc voltage where auto or deep cycle batteries are employed as arc power source. Applicant has determined that where one might expect a manual decrease of welding gun to workpiece distance to decrease arc distance and to decrease arc voltage and a manual increase of welding gun to workpiece distance to increase arc distance and to increase arc voltage, this is in fact not ostensibly the case where, and only where, storage batteries of common auto or deep-cycle type are used as the arc power source. In fact, if the fine wire electrode should contact the workpiece electrode, as it does in initiating the arc, the reserve power of the arc is sufficient to instantaneously melt the electrode, thus opening the arc to a stable gap and initiating the weld process.

Attempts have been made to simplify the handling and feed of the consumable wire to the torch electrode nozzle assembly in such welding equipment. U.S. Pat. No. 2,909,646 uses a pistol type welding gun which is provided with a water cooled electrode nozzle assembly through which a shielding gas is directed to the weld area. However, the electrode wire is fed from a separate and isolated box-like structure which encloses an adjustable speed motor operatively coupled to a drive roll and a pressure roll sandwiching the wire. This requires push feeding of the wire a significant distance to the gun and through the gun nozzle assembly. A trigger switch carried on the pistol grip of the welding gun controls drive motor operation for feeding the thin wire electrode and for controlling shield gas and cooling water flow to the gun.

U.S. Pat. No. 2,490,593 describes a combined portable welding and pneumatic tool useful in repairing cracked parts or casting by welding where it is usually necessary to first form a channel pocket for the welding material where the part is cracked or requires repair, through the use of a chisel, then to deposit the welding material in the channel or pocket which is preferably done by vibrating a rod of welding material and passing an electric current of lower voltage and high amperage through the stick of welding materials. Finally, it is desirable to peen the deposited welded material to produce a smooth dense surface over the welded portion. The patent employs a simple and efficient tool which may be interchangeably used in performing the chisel, welding and peening operations. The versatile tool includes a magazine for holding a series of rods which can be successively used for welding, incorporates a pulsating hammer operable to impart strokes of variable force such as light strokes for peening and welding and heavier strokes for chiseling. It has a welding rod holder which comprises a collet for positively holding the welding rod during welding operations. A pulsating hammer is detachably connected to the welding rod holder with a removable shield on the holder for the hammer. A welding rod holder includes means for delivering air from the hammer to the weld and varying the air flow to provide cooling of the desired degree. A pneumatic hammer has the intensity of the hammer pulsations varied by controlling the air exhausted from the hammer. A single valve means variably controls the operation of the pulsating hammer and variably controls the flow of air to the electrode controlling means. A pneumatic hammer has the operated tool insulated to prevent arcing between the tool and the work while carrying on peening or chiseling operations via a quick detachable connection between the body of the pneumatic hammer and the welding rod or the electrode holder, to permit separate use of the hammer for peening or chiseling.

U.S. Pat. No. 2,909,646 teaches a welding tool of gun form using a pistol grip trigger mechanism for selectively initiating and shutting off of the movement of the drive of the thin wire and the supply of cooling liquid and inert gas to a pistol type apparatus. U.S. Pat. No. 2,490,593 suggests the creating of a combined portable welding an pneumatic tool. U.S. Pat. No. 2,909,646 teaches isolation of the wire drive from the gun receiving the same, and U.S. Pat. No. 2,490,593 suggests only the decoupling of mechanisms integrating portable welding and pneumatic tool.

It is, therefore, a primary object of present invention to provide an accessory or attachment to ordinary electric hand drill for effecting a low cost powered MIG welder utilizing the variable speed motor of electric motor hand drill for controlling the amperage of the welder by variable speed driving of the fine wire electrode maintaining the current source to the electric hand dr motor electrically uncoupled to the DC voltage source the arc without materially affecting the stability of the welding arc.

It is a further object of the present to provide a highly versatile, low cost portable welded as an attachment or accessory to an ordinary AC or DC electric hand drill particularly useful in forming a MIG welder is easy to use, lightweight, and well suited to heavy or welding. It is noteworthy that where circumstance dictates the parallel hook-up of both arc and drive to the same batteries, that no destabilizing relationship between arc and drive is implied or in fact exists. Performance remains unaffected regardless of the existence of said circumstantial parallel circuits because the power reserve of said batteries is sufficient to maintain a stable power supply to the drive unit unaffected by the power to the arc.

SUMMARY OF THE INVENTION

The invention is directed to a simplified, low cost arc welder attachment for an electric hand drill for welding a workpiece acting as a first electrode. A common, standard hand drill comprises a drill casing carrying a drill drive motor with the motor shaft protruding from one end of the casing and operating on a first AC or DC power source. The MIG attachment comprises cover means for attachment to the drill casing, and frictional wire drive means mounted to the cover at 90° to the drill shaft drive and mechanically coupled to the drill motor shaft feeding a fine wire, second electrode. A standard electrode nozzle assembly connected to the wire drive means and including a metal contact tube receives said fine wire second electrode fed by the wire drive means. Second electrical power source means (i.e., two 12 volt DC auto or deep cycle batteries in series, or one 24 volt aircraft battery, or equivalent) are provided for subjecting the workpiece first electrode and the fine wire second electrode to a DC potential difference so as to create an electric arc therebetween capable of melting the wire to create an inexpensive, highly portable welder with the electrical power sources for the arc and for the hand drill motor being independent and electronically uncoupled, wherein the arc heat, or amperage is directly responsive to the wire feed speed and where both soft and hard consumable wire electrodes may be readily employed.

Incorporated within and rotatably mounted on the cover is a spool of fine wire which functions as the fine wire, first electrode supply. Preferably, the hand drill is of pistol form with a hand grip at right angles to the portion of the casing housing the electrical motor, with a trigger switch within the hand grip. The cover supports a right angle drive unit within a portion of the cover overlying the protruding drill motor drive shaft and being directly mechanically coupled to the drive shaft. The cover supports a wire guide assembly via metallic blocks integrated to the right angle drive unit. Wire guide assembly blocks support a pair of laterally spaced, aligned cylindrical bushings through which the fine wire second electrode passes, and across the gap therebetween. The aligned bushings are in juxtaposition to a drive wheel coupled directly to the right angle drive unit. The wire is positioned within a peripheral groove on the drive wheel whose axis is at right angles to the axis of the bushings and the fine wire electrode passing therethrough. One wire guide block mounts an idler wheel on a pivotal arm and resilient means are provided for resiliently pressing the idler wheel, through the arm, against the drive wheel and pressing the fine wire electrode within the groove of the drive wheel to affect frictional pulling of the wire from the spool. The blocks may be formed of conductive metal and may function as a terminal for a low voltage DC cable from the DC supply source. Further, the contact tube may be of metal and be directly supported and fixed to one end of one conductive block, in alignment coaxially with one of the wire guides. A "T" coupling may be integrated with the contact tube and the conductive block and coupled to a source of inert shielding gas for supplying an inert shielding gas to the contact tube so as to surround the arc at the emergence of the fine wire second electrode from the contact tube.

One or more VELCRO ® or buckled straps may releasably mount the cover to the hand drill casing portion housing the electric drill motor. The electric drill motor may be any standard AC or DC rechargeable unit operating on any convenient and standard power source at any convenient speed while two 12 volt lead acid storage batteries may constitute the source of DC potential for effecting the arc between the first and second electrodes.

BRIEF DESCRIPTION OF THE DRAWINGS

FIG. 3 is a bottom plan view of the assembly of FIG. 2.

FIG. 4 is an electrical schematic diagram of a MIG welding system utilizing the attachment shown in FIGS. 1 through 3, inclusive.

DESCRIPTION OF THE PREFERRED EMBODIMENT

Figure 1:
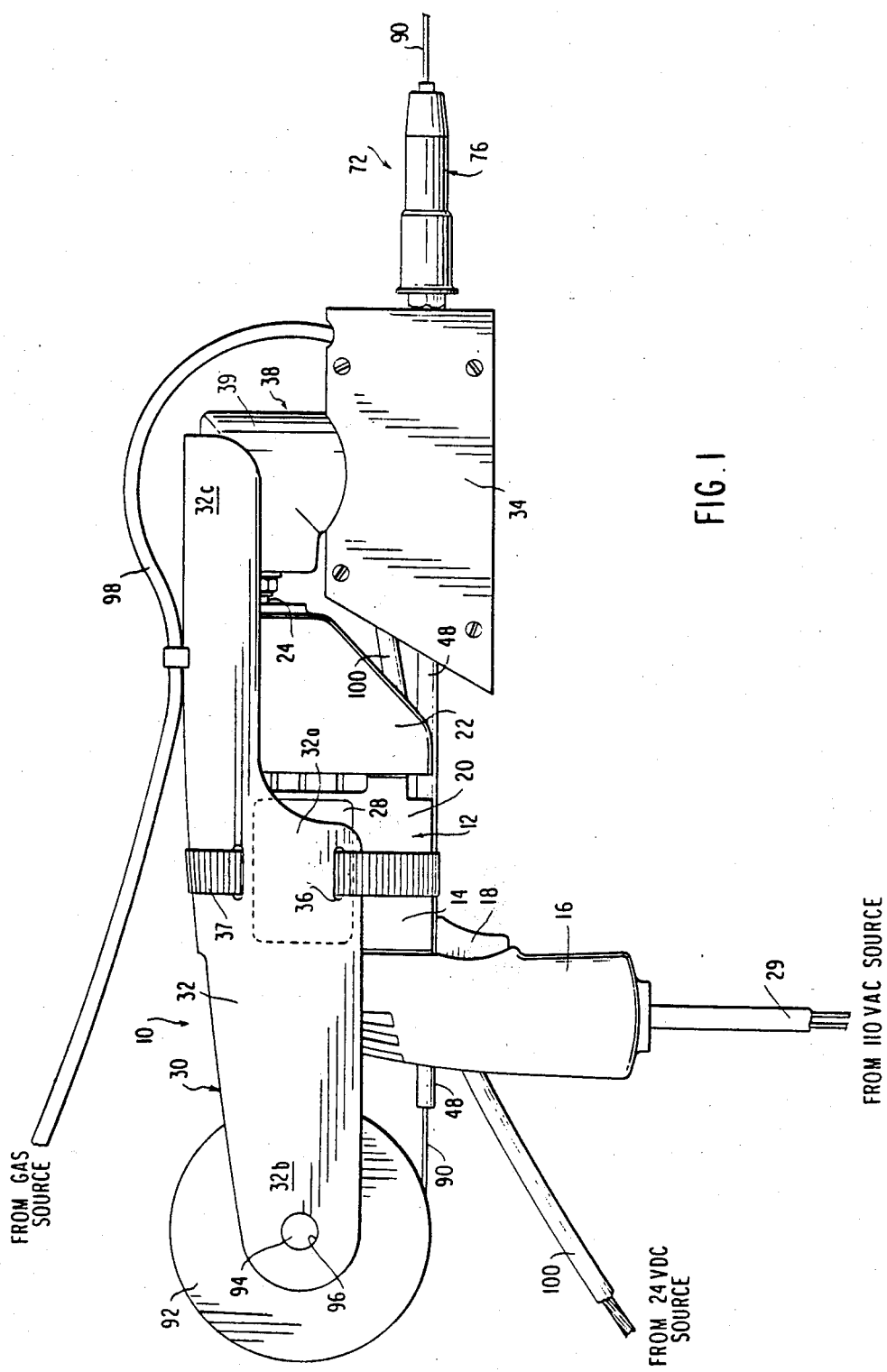
FIG. 1 is a side elevational view of the MIG welder attachment and an electric hand drill to which it is attached and forming a preferred embodiment of the present invention.
Figure 2:
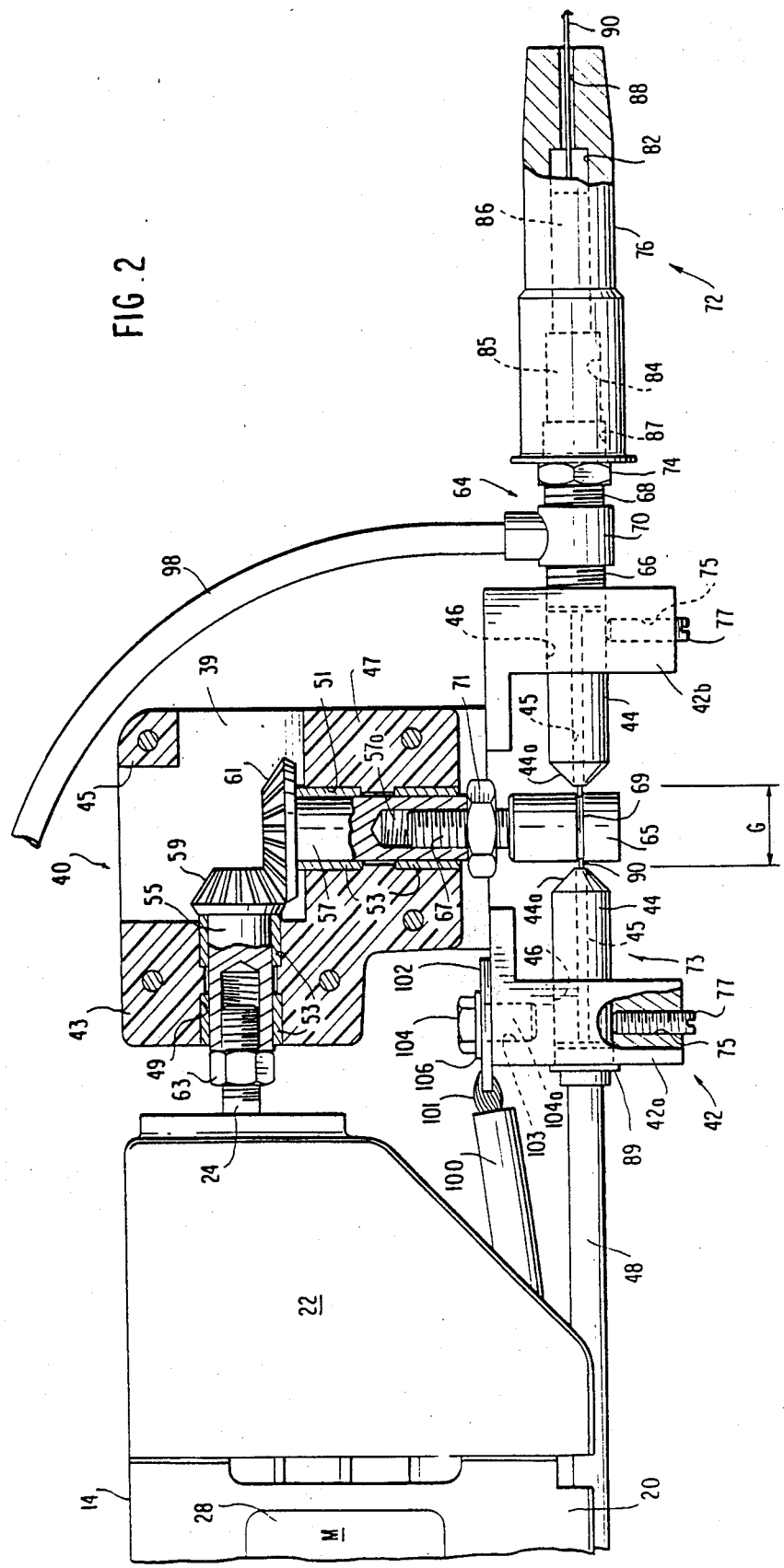
FIG. 2 is a side elevational view, partially broken away of the drill and attachment shown in FIG. 1, with the cover removed.

Referring to the drawings, and particularly to FIGS. 1, 2 and 3, there is shown a MIG arc welder attachment 10 constituting a preferred embodiment of the present invention as mounted to a conventional alternating current electric hand drill indicated generally at 12. Alternatively, the hand drill may be DC powered. The MIG arc welder attachment forms a preferred embodiment of the present invention and constitutes an accessory to the ordinary electric hand drill 12, while all MIG welding equipment is inherently versatile in its ability to achieve good quality results in a wide variety of materials, the extreme simplicity of the MIG welder drill attachment 10 is consistent with and conducive to this versatility. By utilizing attachment 10, it is easy to change loads, tips, gases, polarity, and above all, welding speeds. The ability to vary speed (or amperage) while welding, is a feature of the finest and most expensive welders. In the past, this invariably required the modification of one circuit in order to vary another circuit rendering the control system electronically complex. In contrast, the proliferation of variable speed electric motor drive hand drills insures this feature utilizing the MIG welder attachment of the present invention. Moreover, the user has the option of selecting from a variety of drills for speed, balance, weight, dielectric qualities, etc. For example, the drill 12 may constitute a drill manufactured and sold by Black and Decker under trade designation ⅜" VSR (Variable Speed Reversing). The chuck normally borne by the drill motor shaft 24 may be eliminated, thereby moving the balance of the tool aft. As seen in FIGS. 1 and 2, the drill casing 14 which is preferably formed of electrically insulating material has, projecting downward therefrom, an integral handle 16 bearing a trigger switch 18. The trigger switch includes solid state circuitry (not shown) for varying the current flow through the windings of the electrical motor 28. FIG. 2 so as to vary the output speed of the drill output shaft 24 which projects outwardly from casing 14 at the end of the drill gear speed reduction unit 22. An electric drive motor section 20 of casing 14 carries internally the electric motor 28. Conventionally, an electrical cord 29, which may receive current from a 110 volt AC electrical source (not shown), extends from the bottom of the handle 16 or the drill may be powered by internally contained DC batteries.

In terms of the conventional AC hand-held and relatively inexpensive drill 12, there is believed to be no further need of explanation of the drill or its nature of operation. Pressing the switch 18 inwardly into the handle 16 energizes the electrical drive motor 28 and drives it at variable speed depending upon the amount of retraction of the trigger 18.

The present invention is directed to the MIG arc welder attachment 10 which is constituted principally by a cover assembly 30 housing all of the components and including flexible upper dielectric concave cover 32, overlying the to, configured to and partially surrounding the cylindrical drill casing 14. Cover center portion 32a extends over the full length of the drill casing and cover 32 terminates in ends 32b, 32c which extend beyond the drill casing, at respective rear and front ends thereof. The cover assembly 30 is completed by a lower dielectric cover 34 which is removably or detachably mounted to the upper cover via 90° angle drive reduction gear assembly 38. As may be appreciated, since all of the components are either borne by the upper cover 32, lower cover 34, or the right angle drive reduction gear assembly 38 and since these elements are fixed to each other, a simple mechanical expedient may be employed for detachably coupling the MIG arc welder attachment 10 to the hand drill casing 14, specifically via the drill's chuck or, by removing the chuck, via the drill's spindle. As illustrated, the upper cover 32 is of inverted U shape in transverse section with paired sidewalls of center section 32a being slotted at vertically aligned positions through which slots 36 pass a VELCRO ® strap 37 to frictionally lock the upper cover 32 closely abut the cylindrical drill casing 14. Additionally, a mechanical connection is effected between the drill output shaft 24 and the drive reduction gear assembly 38 so that the attachment 10 and its components are firmly mechanically attached to the hand drill 12 for operation of the MIG arc welder utilizing these components. A 90° angle drive gear assembly housing 40 is composed of laterally spaced, inverted L shape plates 39 screwed to opposite sides of transverse blocks as at 43, 45 and 47. Blocks 43 and 47 include suitably, horizontal and vertical bores 49 and 51 respectively within which are positioned multiple sleeve bearings 53. Bearings 53 rotatably support shafts 55 and 57 which terminate in a pair of bevel gears 59 and 61, respectively, which gears are enmeshed and which are at right angles to each other. Shaft 55 bears a tapped hole within its end remote from bevel gear 59 which receives the drill shaft 24 bearing lock nut 63. Drill output 24 shaft is threaded at its end and preferably threaded into angle drive thread of shaft 55 for the right angle drive reduction gear assembly 30. Right angle shaft 57, at its end opposite bevel gear 61, fixably mounts a single cylindrical drive wheel 65. Drive wheel 65 terminates in a threaded end 67 which is threaded into a tapped bore 57a of shaft 57. A lock nut 71 is threaded to the threaded end 67 of the drive wheel to permit an axially adjustable threaded coupling between drive wheel 65 and its driving shaft 57. The drive wheel 65 is given a certain diameter and is provided with a circumferential groove 69 on its periphery sized to the diameter of a consumable fine wire electrode 90. Wire electrode 90 is driven by being compressed within groove 69 by an idler wheel 54 whose periphery presses with variable pressure against the periphery of drive wheel 65 and sandwiches the wire electrode therebetween.

In order to effect that action, a consumable fine wire electrode feed block assembly, indicated generally at 42, is effectively coupled to the right angle drive reduction gear assembly housing 40, specifically to the lower end of that housing. Feed block assembly 42 is composed principally of left and right side block 42a, 42b, respectively. FIG. 2, which are spaced from each other, and which are of inverted L shape configuration forming a relatively large rectangular cavity 73 therebetween. The blocks 42a, 42b are provided with cylindrical bores 46 within which are inserted cylindrical wire guides or bushings 44. At right angles to bores 46, are tapped holes 75 for side blocks 42a, 42b within which are threaded set screws 77. The set screws may be loosened to permit insertion of the wire guides or bushings 44 within bores 46, or to adjust them and the set screws are then turned down to lock the bushings in axially spaced positions. The bushings may be shifted axially, the purpose of which is to create a gap G of a certain width between conical ends 44a of the respective bushings 44, supported by the left and right side blocks 42a, 42b. The bushings include small diameter axial bores 45, sized slightly larger than the diameter of the consumable fine wire electrode 90 which passes therethrough and which is positioned so as to project within the groove 69 of the drive wheel 65. In order to insure frictional drive of the fine wire electrode 90, and the pulling of the wire electrode 90 from its source, the idler wheel 54 is mounted for rotation about is axis on an axle or pin 56 fixed to idler wheel mounting arm 50. In turn, one end 50a of the idler wheel mounting arm 50 is pivotally mounted by way of mounting screw 52 to the bottom of right side block 42b, FIG. 3. Additionally, an adjustable tension spring 110 has one end affixed to a left side block 42a on its bottom surface by means of a tension spring mounting plate 108 and screw 112. Spring 110 has a second end coupled to tension adjuster lever 115 carried by arm 50. Lever 115 pivots in the direction shown by double headed arrow 114. Thus, the adjustable tension spring 110 (or a rubber band equivalent thereto) adjusts the idler wheel 54 compression on drive wheel 65 which compression must be higher for a hard metal consumable fine wire electrode such as steel in contrast to one formed of a soft metal such as aluminum where low compression is exerted. By utilizing a drive wheel 65 which screws into the tapped hole 69 of the driven gear 61, it may be readily interchanged with other drive wheels for different wire sizes and types with the groove 69 within the periphery of the drive wheel 65 varying in diameter to match the diameter of the consumable wire electrode. Extending outwardly of the right side block section 42b and mounted thereto is an electrode nozzle assembly indicated generally at 72. Assembly 72 is coupled to block 42 via a conductor indicated generally at 64, forming a part thereof. Conductor tube 64 is composed of a pair of external threaded pipes 66, 68 coupled together by a "T" coupling 70. Bore 46 within right side block section 42b is tapped so as to receive the threaded end of pipe 66. The electrode nozzle assembly 72 may constitute a nozzle assembly such as that sold under the trade name TWECO. It comprises a nozzle 76 having a small diameter nozzle bore 88 and counter bore 82 leading to an insulator cavity 84 housing insulator 85. Further, a gas diffuser 86 is carried within counter bore 82 and bore 88. To the left, FIG. 2, a further counter bore 87 of nozzle 76 is threaded and sized to the external thread of pipe 68 which carries a lock nut 74. "T" coupling 70 is connected to hose 98 supplying a shield gas to electrode nozzle assembly 72.

Further, bore 46 of left side block 42a carries a terminal 89, which is connected to one end of a wire guide hose 48 of plastic material. The wire guide hose 48 is formed of plastic for insulating the consumable fine wire electrode 90 as it passes to the right angle drive reduction gear assembly for feed by drive wheel 65. The consumable fine wire electrode 90 is stored in coil form on a spool 92 which mounts for rotation horizontally about its axis on axle 94 within rear end 32b of the upper cover 32. In that respect, oppositely aligned paired holes 96 within the upper cover sidewalls support the spool 92 for rotation with the wire being pulled off the spool due to the frictional drive between the drive wheel 65 and the idler wheel 54.

Turning to FIG. 4, the welding system is schematically represented in one form, in which the attachment 10 is mounted to conventional electric motor driven hand drill 12. In that respect, one end of DC cable 100 has an exposed conductor 101 swaged to terminal 102 with terminal 102 being mounted to the conductive metal block 42a by way of a mounting screw 104 with a lock washer 106 interposed between the head of the screw 104 and the face of the block against which the terminal 102 contacts is in flush engagement. A tapped hole 103 receives the threaded end 104a of screw 104. FIG. 2. The DC cable 100 attaches at its opposite end to the positive terminal 122b, for instance, of one of two lead acid auto or deep cycle storage batteries 122 which are series connected. The series connection is made via a short length cable 123 from the negative terminal 122a of one battery to the positive terminal 122b of the adjacent battery 122. In turn, a further DC cable 120 connects at one end to negative terminal 122a of the second battery and terminates in a mechanical clamp 118 which detachably clamps to the workpiece 116 functioning as the first electrode for the arc welding system. The consumable fine wire second electrode 90 when positioned adjacent to the workpiece 116 creates arc 124 and the tip of the fine wire electrode 90 is consumed in the process. The speed of the weld and the arc power is controlled by the drive speed of the electrical motor 28 for hand drill 12 feeding the wire electrode to arc 124.

In addition, as shown in FIG. 4, an inert or other shield gas, if used, is fed via hose 98 to surround the arc 124 by escaping from the small diameter bore 88 of nozzle 76. The shield gas is supplied form a tank or bottle 126 controlled by regulator 128 and flow may be shut off by either a manual valve or a solenoid valve such as valve 130 and connected between attachment 10 and the regulator 128.

With bevel gears 59, 61 sized to provide a 2 to 1 speed reduction, the fine wire electrode is pulled through the attachment 10 with ease. Variable speed drive may be assured with input provision of a 24 volt arc power source such as two ordinary 12 volt lead acid storage batteries. The fine wire consumable electrode 90 may constitute a 0.045 inch flux core mild steel wire which may be used without a shielding gas. An inert/shielding gas may be employed as necessary. A standard TWECO No. 2 MIG torch tip may form nozzle assembly 72 readily mounted via its contact tube 64 to the end of block 42 remote from the source of the wire electrode 90.

Attachment 10 makes ready provision for changing the drive wheels or capstans and adjusting the tension on the idler wheel to suit different types of wire electrodes being fed. Either polarity may be used and drive wheel speed control is achieved by speed control incorporated in the drill, sufficiently geared down to 2 to 1 by right angle reduction. A one-half inch drive wheel provides a 1.57 linear inch of wire feed per revolution so that surges and uneven wire feed speed are avoided when the speed is varied during welding. The deep-cycle or auto batteries 122 may be of the 80 amp hour type. As appreciated, it is simple and quick to change loads, tips, gases, polarity and speeds. Of course, as the diameter of the fine wire electrode 90 increases, it may be necessary to use a higher speed ¼ inch electric drill rather than a ⅜ inch electric drill. The invention has application to 300 and 600 RPM rechargeable drills with or without speed control particularly for welding ⅛" aluminum by reversing 90° angle drive from 2:1 reduction to 1:2 increase in drive speed. Further, all 6 and 9.5 volt DC drills can be run on 12 volts for more speed. The applicant has found that it is both possible and safe to have the drill running on a power source which is entirely independent of the 24 volt arc power source. The applicant has found that the common car battery has so little internal resistance and such immense power that one does not vary the arc voltage significantly by attempting to vary the arc distance and so, fortuitously, an ordinary auto battery happens to be an ideal source of inherently stable arc voltage. As such, the applicant derives the versatility of a variable speed wire drive without expensive electronic complications that are normally required when utilizing a common electrical source for both the wire drive and the arc power. A DC battery such as an ordinary auto battery, or several DC batteries in series such as batteries 122, FIG. 4, may additionally function as the source of DC power to the drill motor of the 12 V DC electric drill 12 in which case, the connection is made via line 29' as shown in dotted form and in which, the two electrical wires 31, 39 thereof connect to the positive and negative electrodes 122b, 122a of a battery 122. In such case, the arc source is formed by the two batteries 122 in series, while the source of drive power for the hand drill motor of hand drill 12 is a single one of the batteries with the circuit including the drive motor 22 being across a single battery and the circuit including the arc 124 across both batteries.

It should be kept in mind that the ordinary electric hand drill may be of the conventional 110 volt AC type. It may be 220 volt AC, it may be 12 volt DC, rechargeable or any other powered hand drill capable of feeding the consumable fine wire electrode. Further, the consumable wire electrode (which is shown as positive in FIG. 4) may be of either polarity (i.e. positive or negative) without affecting the motor drive at all all since the motor drive is electrically independent of arc power. Therefore, no changes are required for the drill to which the welding attachment is coupled. (In some units changing arc polarity causes the drive motor to reverse and this must be adjusted for by separate means).

While there has been described what is at present considered to be the preferred embodiments of this invention, it will be obvious to those skilled in the art that various changes and modifications can be made therein without departing from the invention, and it is, therefore, intended to cover all such changes and modifications as fall within the true spirit and scope of the invention.

I claim:

1. A consumable wire electrode welding system including:
    a metal workpiece acting as a first electrode, a consumable fine wire second electrode, means for feeding said consumable fine wire second electrode towards said metal workpiece for initiating and maintaining an electrical arc therebetween, said feeding means including an electric drive motor, a first arc power means connected between said electrodes for creating an electrical welding arc therebetween, second electrical drive power means for energizing said electric drive motor, control means for selectively connecting said second electrical drive power means to said electric motor and for varying the power supply thereto for the purpose of varying the speed of the consumable wire electrode feed, the improvement wherein said first arc power means and said second electrical drive power means comprises at least one storage battery, and wherein separate circuits are defined by said at least one storage battery and said electrodes, and said at least one storage battery and said electric drive motor, which separate circuits are substantially electrically unaffected by each other such that there is no appreciable drop in arc voltage resulting from variation in drive speed of said motor or vice versa, with said first arc power means at least one battery constituting an inherently stable, totally unregulated welding arc power supply.

2. The consumable wire electrode welding system as claimed in claim 1, wherein said at least one storage battery comprises a pair of DC batteries in series, and wherein said second electrical drive power means comprises one of said DC batteries with said electric drive motor connected across said one DC battery, forming one of said separate circuits.

3. A consumable wire electrode welding system including:
    a metal workpiece acting as s first electrode, a consumable fine wire second electrode, means for feeding said consumable fine wire second electrode towards said metal workpiece for initiating and maintaining an electrical arc therebetween, said feeding means including an electric drive motor, at least one source of electrical power, means for connecting said at least one source of electrical power between said electrodes, control means for selectively connecting said at least one source of electrical power to said electric drive motor and for varying the power supply thereto for the purpose of varying the speed of the consumable wire electrode feed, the improvement wherein said at least one source of electrical power comprises at least one storage battery, and wherein, separate, parallel circuits are defined by said at least one storage battery and said electrodes and by said at least one storage battery and said electric drive motor, which circuits are substantially electrically unaffected by each other such that there is no appreciable drop in arc voltage from operation of said electric drive motor or from variation in drive speed of the feed of said consumable fine wire second electrode towards said metal workpiece with said circuit defined by said at least one storage battery and said electrode constituting an inherently stable, totally unregulated welding arc circuit.

* * * * *